United States Patent
Dunn et al.

(10) Patent No.: US 7,847,740 B2
(45) Date of Patent: Dec. 7, 2010

(54) ANTENNA SYSTEM HAVING RECEIVER ANTENNA DIVERSITY AND CONFIGURABLE TRANSMISSION ANTENNA AND METHOD OF MANAGEMENT THEREOF

(75) Inventors: Doug Dunn, San Diego, CA (US); Gregory Poilasne, San Diego, CA (US); Henry Chang, San Diego, CA (US); Huan-Sheng Hwang, San Diego, CA (US); Ramon Khalona, Carlsbad, CA (US)

(73) Assignee: Kyocera Corporation, Kyoto (JP)

( * ) Notice: Subject to any disclaimer, the term of this patent is extended or adjusted under 35 U.S.C. 154(b) by 45 days.

(21) Appl. No.: 11/353,267

(22) Filed: Feb. 13, 2006

(65) Prior Publication Data

US 2007/0188390 A1    Aug. 16, 2007

(51) Int. Cl.
*H01Q 1/24* (2006.01)
*H04B 7/02* (2006.01)

(52) U.S. Cl. .................. 343/702; 343/833; 343/876; 455/277.2

(58) Field of Classification Search .......... 343/702, 343/853, 844, 833, 834, 810, 858, 876; 455/562.1, 455/575.7, 277.1, 277.2; 342/51
See application file for complete search history.

(56) References Cited

U.S. PATENT DOCUMENTS

| | | | |
|---|---|---|---|
| 5,121,391 A * | 6/1992 | Paneth et al. ............. | 370/341 |
| 5,842,118 A * | 11/1998 | Wood, Jr. .................. | 455/101 |
| 5,905,473 A | 5/1999 | Taenzer | |
| 6,021,317 A | 2/2000 | Irvin | |
| 6,392,610 B1 * | 5/2002 | Braun et al. ............... | 343/876 |
| 6,407,719 B1 | 6/2002 | Ohira et al. | |
| 6,518,920 B2 | 2/2003 | Proctor, Jr. et al. | |
| 6,600,456 B2 | 7/2003 | Gothard et al. | |
| 6,600,901 B1 | 7/2003 | Koehne et al. | |
| 6,753,826 B2 * | 6/2004 | Chiang et al. ............. | 343/834 |
| 6,774,845 B2 * | 8/2004 | De Champlain ........... | 342/374 |
| 6,980,782 B1 | 12/2005 | Braun et al. | |
| 7,292,201 B2 * | 11/2007 | Nagaev et al. ............. | 343/818 |
| 2004/0032366 A1 | 2/2004 | Langenberg | |
| 2004/0063466 A1 | 4/2004 | Fujii et al. | |
| 2004/0113851 A1 | 6/2004 | Gothard et al. | |
| 2004/0121740 A1 | 6/2004 | Miyano | |
| 2004/0132515 A1 | 7/2004 | Sunaga | |
| 2005/0007292 A1 | 1/2005 | Lee et al. | |
| 2005/0057394 A1 | 3/2005 | Lee | |
| 2005/0064824 A1 | 3/2005 | Bergervoet et al. | |

FOREIGN PATENT DOCUMENTS

| | | |
|---|---|---|
| EP | 0 878 865 A1 | 11/1998 |
| EP | 0 987 842 A1 | 3/2000 |
| JP | 05-095298 | 4/1993 |
| JP | 2002-232385 | 8/2002 |
| WO | WO 2004/054131 A1 | 6/2004 |

\* cited by examiner

*Primary Examiner*—Michael C Wimer

(57) ABSTRACT

An antenna system comprises a receive diversity antenna system and a configurable antenna arrangement. Incoming signals are received through the receive diversity antenna system and outgoing signals are transmitted through the configurable antenna arrangement. A controller generates control signals to adjust the configurable antenna arrangement to change the transmission performance characteristics of the configurable antenna arrangement. The configurable antenna arrangement may be a smart antenna, a plurality of antennas, or a configurable antenna where transmission characteristics change in response to control signals.

19 Claims, 2 Drawing Sheets of the invention, outgoing signals are transmitted through a configurable antenna arrangement and incoming signals are received through a receive diversity antenna system. In the exemplary embodiments, the configurable antenna arrangement is responsive to control signals generated by a controller based on near field and/or far field conditions. Where the configurable antenna arrangement includes a plurality of antennas, the controller selects the optimum antenna for transmission. Where the configurable antenna arrangement includes a configurable antenna, the controller generates control signals to change the transmission characteristics of the configurable antenna. In the exemplary embodiments, the configurable antenna includes a tunable parasitic element that is response to the control signals. A portion of the configurable antenna arrangement may be part of the receive diversity antenna system in some circumstances. For example, a configurable antenna may be may be one of the plurality antennas of the receive diversity antenna system as described with reference to the FIG. 2 and the first exemplary embodiment.

ANTENNA SYSTEM HAVING RECEIVER ANTENNA DIVERSITY AND CONFIGURABLE TRANSMISSION ANTENNA AND METHOD OF MANAGEMENT THEREOF

FIELD OF THE INVENTION

The invention relates in general to wireless communication systems and more specifically to an antenna system having receive diversity antennas and a configurable transmission antenna.

BACKGROUND OF THE INVENTION

Many wireless communications devices transmit and receive electromagnetic signals through antennas. In order to improve reception, conventional devices utilize receive diversity antennas where two or more antennas are used to receive an incoming signal. The multiple versions of the incoming signal may be simultaneously received through the antennas and processed to increase signal quality or the incoming signal may be received through a selected antenna having better performance than other antennas. Typically, the transmission of outgoing signals cannot be improved by simply transmitting the outgoing signals through diversity antennas. As a result, many wireless communication systems suffer from an unbalanced communication channel where improved reception efficiency at a communication device is not matched by any improvement in transmission efficiency.

Therefore, there is a need for an antenna system having receive diversity antennas and a configurable transmission antenna.

SUMMARY OF THE INVENTION

An antenna system comprises a receive diversity antenna system and a configurable antenna arrangement. Incoming signals are received through the receive diversity antenna system and outgoing signals are transmitted through the configurable antenna arrangement. A controller generates control signals to adjust the configurable antenna arrangement to change the transmission performance characteristics of the configurable antenna arrangement.

DETAILED DESCRIPTION

In accordance with the exemplary embodiments

Figure 1:
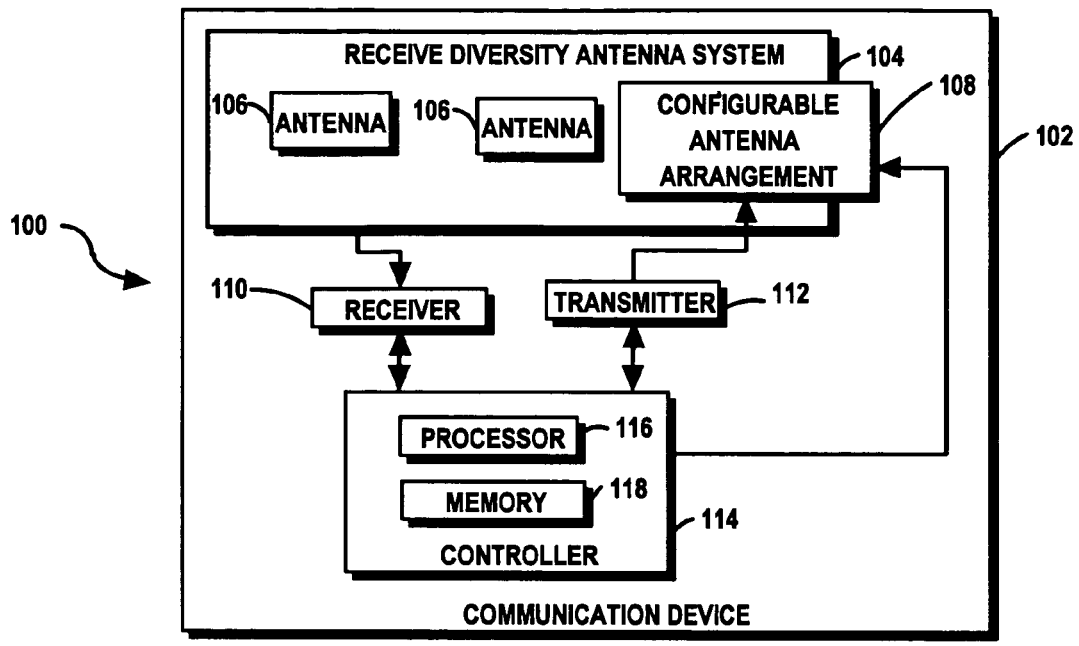
FIG. 1 is a block diagram of a portable communication device in accordance with the exemplary embodiments of the invention.

FIG. 1 is a block diagram of a communication device 102 in accordance with the exemplary embodiments of the invention. Although the communication device 102 is a portable communication device such as a cellular telephone or wireless personal digital assistant (PDA) in the exemplary embodiments, the communication device 102 may be a fixed device such as a base station or access point in some circumstances. The communication device 102 may include other hardware, software, or firmware not shown in FIG. 1 for facilitating and performing the functions of a communication device 102. For example, the communication device 102 may include input and output devices such as keypads, displays, microphones and speakers. Further, the functions and operations of the blocks described in FIG. 1 may be implemented in any number of devices, circuits, or elements. Two or more of the functional blocks may be integrated in a single device and the functions described as performed in any single device may be implemented over several devices. For example, the transmitter 112 and the receiver 110 may include and utilize common circuitry or elements in some circumstances.

A receiver 110 and transmitter 112 receive and transmit signals through an antenna system 100. The antenna system 100 includes at least the antenna receive diversity antenna system 104, the configurable antenna arrangement 108, and portions of the controller 114.

The receive diversity antenna system 104 comprises a plurality of antennas 106 arranged to provide pattern diversity, polarization diversity, or spatial diversity. Depending on operating frequencies, spatial diversity may not be practical in some portable communication devices where size may limit the placement of the antennas. In the exemplary embodiments, the receive diversity antenna system includes two antennas 106 configured to minimize correlation between signals received through the antennas.

The configurable antenna arrangement 108 includes one or more antennas and has transmission performance characteristics that can be changed. In the exemplary embodiments, the configurable antenna arrangement is a single antenna where the performance characteristics are changed by adjusting at least one parasitic element. In some situations, however, the configurable antenna arrangement includes two or more antennas where the characteristics of the configurable antenna arrangement are changed by selecting one of the antennas. The configurable antenna arrangement 108 is shown as a block that partially overlaps the block representing the receive diversity antenna system 104 to illustrate that at least a portion of the configurable antenna arrangement may be part of the receive diversity antenna system 104. For example, in the first exemplary embodiment discussed with reference to FIG. 2, the configurable antenna arrangement is a configurable antenna that is one of the plurality of antennas 106 of the receive diversity antenna system 104. In the second exemplary embodiment, the configurable antenna arrangement 108 is a configurable antenna 203 separate from the plurality of antennas 106 of the receive diversity antenna system 104. The configurable antenna arrangement may include a one or more smart antennas, antenna arrays or other dynamically controllable antennas.

The receiver 110 is coupled to the receive diversity antenna system 104 and receives signals through one or more antennas 106. Switches, duplexers and or diplexers (not shown) may be used to couple the receiver to the antennas 106 and the transmitter 112 to the configurable antenna arrangement 108. The transmitter 112 transmits signals through the configurable antenna arrangement 108.

The antennas 106 may be any dipole, loop, patch, Planar Inverted "F" (PIFA), inverted F, monopole, balanced antennas, or stubby antennas that can exchange signals with a communication system. The particular antenna type of the antennas 106 is selected based on the operating frequencies, bandwidth, and power levels used by the communication device 102, and in accordance with other design parameters such as efficiency, size, impedance, durability, gain, polarization, cost, industrial design, and weight.

The controller 114 is any device, circuit, integrated circuit (IC), application specific IC (ASIC), or other configuration including any combination of hardware, software and/or firmware that performs the functions described herein as well as facilitating the overall functionality of the communication device 102. In the exemplary embodiment, the controller 114 includes a processor 116 and a memory 118. The processor 116 is any computer, processor, microprocessor, or processor arrangement that executes software code to perform the calculation and control functions described herein. The memory 118 is any memory device, IC, or memory medium suitable for storing code and data that can be accessed by the processor 116. The controller 114 may include other devices, circuits and elements not shown in FIG. 1 that facilitate the exchange of signals and perform other interface functions. For example, the controller 114 includes digital to analog (D/A) converters to provide analog control signals to the configurable antenna arrangement in some circumstances.

During operation, the controller 114 generates control signals to configure the configurable antenna arrangement 108 to maximize transmission performance characteristics of the antenna system 100. Where the configurable antenna arrangement 108 includes a plurality of antennas, the controller 114 selects one of the antennas by generating control signals to control switches to connect the selected antenna. Where the configurable antenna arrangement is a configurable antenna, the controller 114 generates control signals to change the transmission characteristics of the configurable antenna. The control signals are generated based on parameters indicating transmission performance when signals are transmitted from the communication device 102 and received at a destination device. The parameters may include any combination of parameters measured at the communication device 102 and/or parameters measured at the destination device. The controller 114 generates control signals to improve transmission performance characteristics of the configurable antenna arrangement 108 based on near field conditions, far field conditions, or a combination of both. Near field conditions include parameters such as the antenna input impedance, the antenna return loss, or the current distribution. Far field conditions include radiation pattern or polarization as observed by the entity receiving the signal. In the exemplary embodiments, transmission characteristics of the configurable antenna arrangement 108 are changed by adjusting the impedance of the antenna and/or changing an antenna pattern based on measured parameters. A suitable method for adjusting the impedance includes adjusting the impedance based on measurements performed by a mismatch detector (not shown) at the antenna. Based on the quality of the electromagnetic signals exchanged through the antenna, the controller 114 produces a control signal to change the far field characteristics of the configurable antenna based on signal quality parameters such as power control signals during transmission. Other measurements and parameters can be used in some circumstances to determine the quality of a transmitted or received signal. The parameters may be measured by communication device 102 or by other equipment in the communication system. Examples of other signal quality parameters include bit error rate (BER), frame error rate (FER), output power, or power control information.

Figure 2:
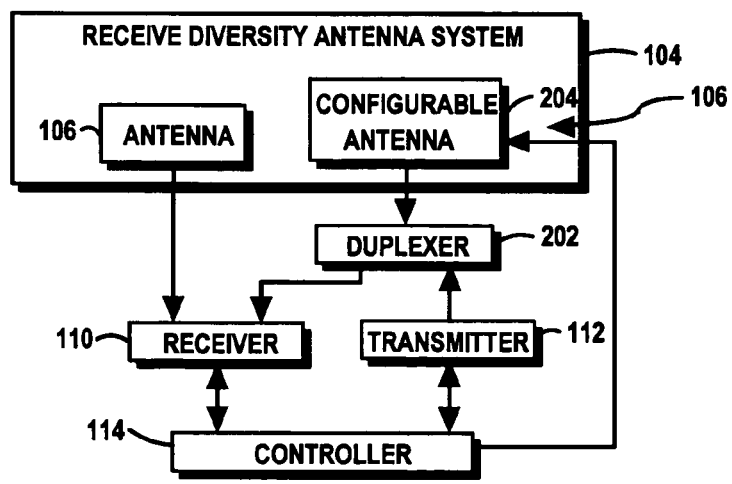
FIG. 2 is a block diagram of the antenna system in accordance with a first exemplary embodiment where one of the receive diversity antennas is a configurable antenna for transmission.

FIG. 2 is a block diagram of an antenna system 100 where the receive diversity antenna system 104 includes two antennas 106 and one of the antennas 106 is a configurable antenna 204 in accordance with a first exemplary embodiment. A duplexer 202 couples the configurable antenna to the receiver 110 and the transmitter. Incoming signals are received through the antenna and the configurable antenna 204, and outgoing signals are transmitted through the configurable antenna 204.

Figure 3:
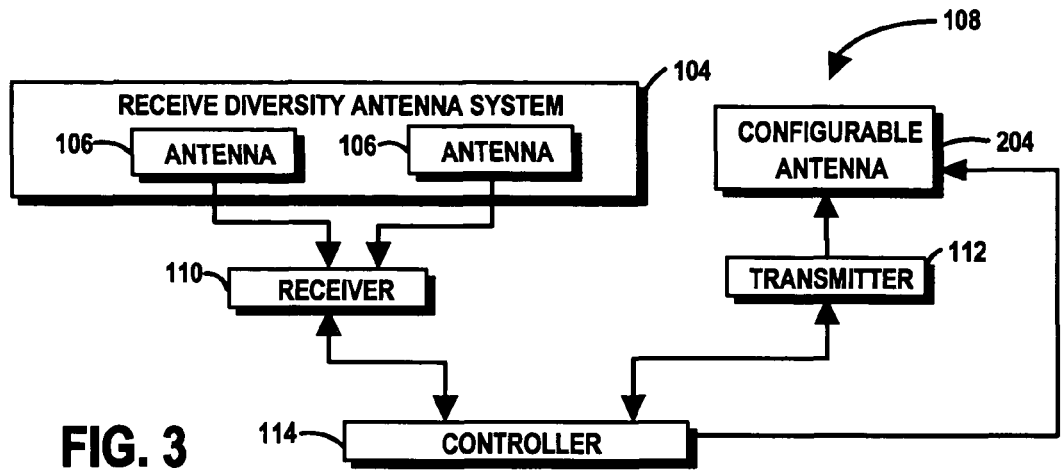
FIG. 3 is a block diagram of the antenna system in accordance with a second exemplary embodiment where the receive antenna arrangement includes two antennas and the configurable antenna arrangement is a separate configurable antenna.

FIG. 3 is block diagram of an antenna system 100 where the receive diversity antenna system 104 includes two antennas 106. The configurable antenna arrangement 108 is a configurable antenna 204 separate from the receive diversity antenna system 104 in accordance with a second exemplary embodiment. The controller generates control signals based on quality parameters and impedance measurements as discussed above with reference to the first exemplary embodiment.

Figure 4:
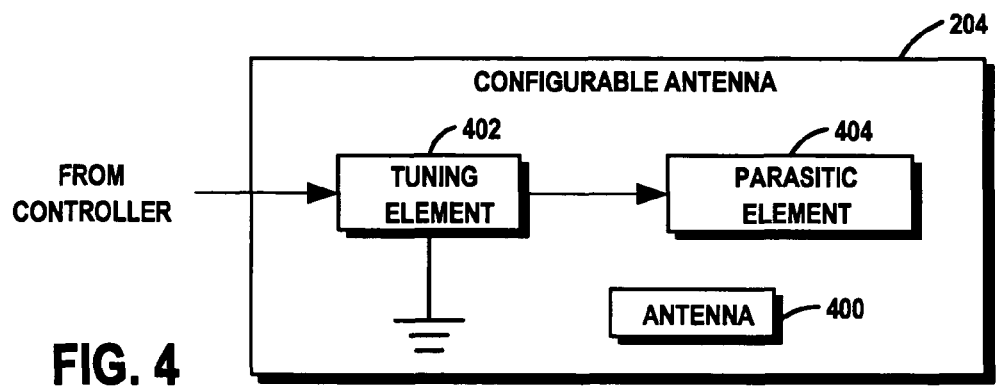
FIG. 4 is a block diagram of the configurable antenna in accordance with the exemplary embodiments of the invention.

FIG. 4 is a block diagram of an exemplary configurable antenna 204 that includes an antenna 400, a tuning element 402, and a parasitic element 404. The parasitic element 404, is any section of wire, metal structure, sheet metal, conductive strip, or other electrically conductive material. During operation, the mutual coupling of parasitic element 404 to the antenna alters the radiation-induced current flows within a device ground or counterpoise to change the characteristics of the antenna 400. The device ground includes printed circuit board (PCB) ground layers and other conductive elements comprising the ground potential surface of the portable communication device 102.

The tuning element 402 is any switch, variable impedance device, or any combination of switches and variable impedance devices that are responsive to a control signal. Examples of suitable devices that can be used to form the tuning element 402 include coupling elements such as field effect transistors (FETs), bipolar transistors, PIN diodes, ferroelectric capacitors, varactor diodes, and microelectromechanical systems (MEMS) switches. By presenting the appropriate control signal, the electrical coupling between the parasitic element 404 and device ground and/or other components is adjusted to change the behavior of the antenna. The geometry of the parasitic element 404, therefore, is adjusted by the control signal to determine how the antenna system behaves. Exemplary parasitic element configurations are discussed in further detail in U.S. patent application Ser. No. 10/940,206, entitled "Wireless Device Reconfigurable Radiation Desensitivity Bracket Systems and Methods" and U.S. patent application Ser. No. 10/940,702, entitled "Wireless Device Reconfigurable Radiation Desensitivity Bracket Systems and Methods", both filed Sep. 14, 2004 and incorporated by reference in their entirety herein.

Figure 5:
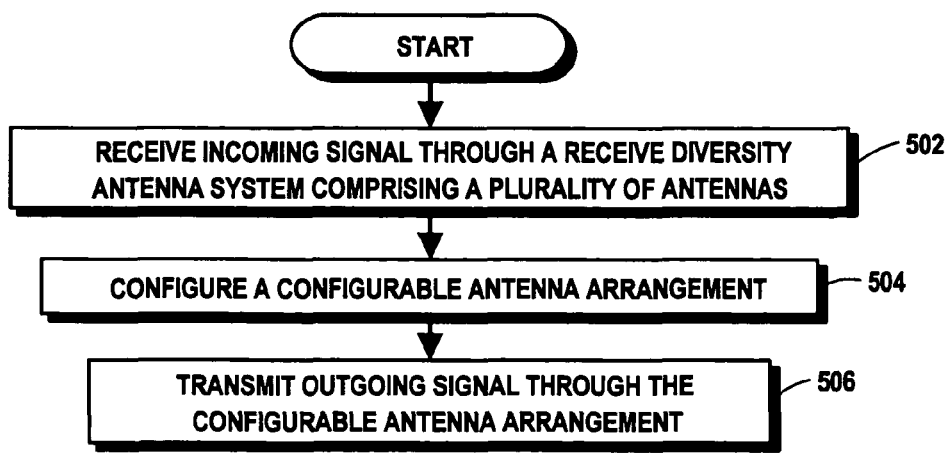
FIG. 5 is flow chart of a method of managing an antenna system comprising a diversity antenna system and a configurable antenna arrangement in accordance with the exemplary embodiments.

FIG. 5 is a flow chart of a method of an antenna system having a receive diversity and a configurable transmission antenna in accordance with the exemplary embodiments of the invention. The exemplary method is performed within the communication device 102 and includes executing software code in the controller 114. The method, however, may be performed using any combination of hardware and/or software in any type of device. The execution of the steps may occur in order other than shown in FIG. 5 including the simultaneous performance of one or more steps.

At step 502, an incoming signal is received through the receive diversity antenna system 104. In the exemplary embodiment, the multiple versions of the incoming signal are received through a plurality of antennas 106 and processed. A baseband processor with the controller 114 further filters and otherwise processes the received information to generate the baseband signal.

At step 504, the configurable antenna arrangement is configured. Where the configurable antenna arrangement 108 includes a plurality of antennas, the controller 114 identifies the preferred antenna that provides the best transmission performance and generates control signals to select the preferred antenna. Where the configurable antenna arrangement comprises a configurable antenna with tunable parasitic elements 404, the controller 114 generates control signals to tune one or more parasitic elements 404 to increase the antenna transmission performance of the antenna 400. In the exemplary embodiment, the control signals are generated based on near field and/or far field conditions. Parameters measured at the communication device and/or measured by other equipment within the communication system are used to determine the optimum configuration of the configurable antenna arrangement 108.

At step 506, an outgoing signal is transmitted through the configurable antenna arrangement. In some situations, the configurable antenna arrangement may be adjusted while the outgoing signals are transmitted. In other circumstances, measurements obtained during previous transmissions are used to configure the configurable antenna arrangement before the next transmission. Further, some measurements may be obtained without transmitting a data or voice signal. In some circumstances, antenna adjustments may need to be avoided during particular transmissions. For example, changes to the antenna arrangement may be avoided during times when the communication device 102 sends access probes.

Therefore, advantages of receive diversity are realized while transmission performance is improved with the configurable antenna arrangement. By selecting the optimum path for the transmitted signals by beam steering, antenna selection, or antenna tuning, the transmission power into the transmit antenna can be minimized while maintaining an appropriate connection with the target device such as base station. Alternatively, by selecting the optimum path for the transmitted signals by beam steering, antenna selection or antenna tuning, the same transmission power into the transmit antenna can increase the link budget on the uplink and optimize data throughput. Where the communication device 102 is a CDMA cellular telephone, receive diversity antennas provide significant performance improvement in the downlink. An appropriate balance in performance between the uplink and downlink paths is maintained by improving transmitter efficiency using the configurable antenna arrangement.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An antenna system comprising:
   a receive diversity antenna system comprising a plurality of antennas; and
   a configurable antenna arrangement having transmission performance characteristics responsive to control signals and comprising at least one of the plurality of antennas, the configurable antenna arrangement comprising:
   a configurable transmission antenna; and
   a parasitic element responsive to the control signals to change the transmission performance characteristics.

2. The antenna system of claim 1, wherein the at least one of the plurality of antennas is the configurable transmission antenna.

3. The antenna system of claim 1, wherein the at least one of the plurality of antennas is a configurable antenna.

4. The antenna system of claim 1, further comprising:
   a controller configured to generate the control signals in accordance with near field antenna conditions.

5. The antenna system of claim 1, further comprising:
   a controller configured to generate the control signals in accordance with far field antenna conditions.

6. The antenna system of claim 1, further comprising a switch connected to the plurality of antennas and configured to selectively couple the plurality of antennas to a transmitter.

7. The antenna system of claim 1, wherein the configurable antenna arrangement comprises a plurality of transmission antennas, the configurable antenna arrangement configurable by selecting one of the plurality of transmission antennas.

8. The antenna system of claim 1, wherein each antenna of the plurality of antennas is configured to separately connect to a receiver.

9. A method of managing an antenna system, the method comprising:
   receiving an incoming signal through a receive diversity antenna system comprising a plurality of antennas;
   configuring a configurable antenna arrangement to connect at least one of the plurality of antennas to a transmitter, the configuring comprising adjusting a parasitic element to change antenna performance characteristics of a transmission antenna; and
   transmitting an outgoing signal through the configurable antenna arrangement.

10. The method of claim 9, wherein the configuring comprises:
    configuring the configurable antenna arrangement in accordance with near field antenna conditions.

11. The method of claim 9, wherein the configuring comprises:
    configuring the configurable antenna in accordance with far field antenna conditions.

12. The method of claim 9, wherein the receiving an incoming signal through a receive diversity antenna system comprises receiving a different version of the incoming signal through each of the plurality of antennas.

13. A communication device comprising:
 a receive diversity antenna configuration comprising a plurality of antennas;
 a configurable antenna arrangement having transmission performance characteristics responsive to control signals and comprising at least one of the plurality of antennas, the configurable antenna arrangement comprising:
 a configurable transmission antenna; and
 a parasitic element responsive to the control signals to change the transmission performance characteristics; and a controller configured to generate the control signals.

14. The communication device of claim 13, further comprising:
 a transmitter coupled to the configurable antenna arrangement; and
 a receiver coupled to the receive diversity antenna configuration.

15. The communication device of claim 14, wherein the at least one of the plurality of antennas is the configurable transmission antenna.

16. The communication device of claim 14, wherein the at least one of the plurality of antennas is a configurable antenna.

17. The communication device of claim 14, further comprising a switch connected to the plurality of antennas and configured to selectively couple the plurality of antennas to the transmitter.

18. The communication device of claim 14, wherein the configurable antenna arrangement comprises a plurality of transmission antennas, the configurable antenna arrangement configurable by selecting one of the plurality of transmission antennas.

19. The communication device of claim 13, wherein each antenna of the plurality of antennas is configured to separately connect to a receiver.

* * * * *